United States Patent [19]

Dolph et al.

[11] Patent Number: 4,771,390

[45] Date of Patent: Sep. 13, 1988

[54] MOTOR VEHICLE SPEECH PROCESSOR METHOD AND APPARATUS

[75] Inventors: Darrel A. Dolph, Hersey; Leonard W. Demski, Reed City; Robert E. Taylor, Cadillac; Arthur R. McKendry, Reed City, all of Mich.

[73] Assignee: Nartron Corporation, Reed City, Mich.

[21] Appl. No.: 525,315

[22] Filed: Aug. 22, 1983

[51] Int. Cl.⁴ ............................................. G10L 5/00
[52] U.S. Cl. ................................................. 364/513.5
[58] Field of Search ............... 364/200, 900 MS File, 364/178, 179, 513.5; 381/51; 340/52 R, 52 F, 692, 384 E

[56] References Cited

U.S. PATENT DOCUMENTS

| | | | |
|---|---|---|---|
| 3,953,835 | 4/1976 | Cuccio et al. | 364/200 |
| 4,015,609 | 4/1977 | Mensink et al. | 363/16 |
| 4,166,358 | 9/1979 | Tremblay et al. | 368/245 |
| 4,352,088 | 8/1982 | Tsunoda | 340/52 F |
| 4,363,092 | 12/1982 | Abo et al. | 364/200 |
| 4,387,269 | 6/1983 | Hashimoto et al. | 381/51 |
| 4,389,537 | 6/1983 | Tsunoda et al. | 381/51 |
| 4,389,563 | 6/1983 | Ricard | 364/467 |
| 4,389,639 | 6/1983 | Torii et al. | 340/531 |
| 4,393,371 | 7/1983 | Morgan-Smith | 340/347 |
| 4,415,968 | 11/1983 | Maeda et al. | 364/184 |

*Primary Examiner*—E. S. Matt Kemeny
*Attorney, Agent, or Firm*—Watts, Hoffmann, Fisher & Heinke Co.

[57] ABSTRACT

A speech synthesizer circuit for use in an automobile. The circuit includes a dedicated microprocessor and a speech synthesizer integrated circuit which has an output couplable to the speakers of the automobile's radio. The microprocessor monitors various automobile status conditions and, based upon these conditions, causes various preprogrammed voice messages to be transmitted to the motorist. The circuit includes various novel speech synthesizer features. These features includes novel circuit energization, condition sensing, failure detection, and voice activation mechanisms.

17 Claims, 4 Drawing Sheets

MOTOR VEHICLE SPEECH PROCESSOR METHOD AND APPARATUS

MOTOR VEHICLE DESCRIPTION

1. Technical Field

The present invention relates to a speech synthesizer, and more particularly to a speech synthesizer module for monitoring status conditions in an automobile and sending a voice message to a motorist when certain status conditions exist.

2. Background Art

Microprocessor controllers have impacted the electronics industry in as big a way as the transistor did 25 years ago. Today's state of the art 32 bit microprocessors evolved from a four bit integrated circuit which, at its conception, was believed to have limited usefulness. The variety of uses for the microprocessor controller however, has expanded at least as quickly as the performance capabilities of the microprocessor hardware.

A typical microprocessor controller system includes hardware for performing a control function, hardware to allow a user and/or other computers to interface with the microprocessor, and software for controlling operation of the system. Some typical interfaces to the microprocessor system are cathode ray screens, keyboard interfaces, and printers. One use of the controller system may be to monitor various conditions and apprise the user and/or other hardware of the existence of certain status conditions as those conditions are sensed.

A special form of a microprocessor known as a speech synthesizer is a rather sophisticated output device gaining popularity for certain uses. The speech synthesizer can generate messages almost indistinguishable from the human voice. Speech synthesizers have added flexibility and user friendliness to a variety of controller applications such as computer aided instruction A variety of literature sources describe the functioning of these special function microprocessors. There are a number of different techniques in generating artificial speech. So-called "format synthesis" is an electronic modeling of the human vocal track. One specific form of the format technique is called phoneme synthesis where messages are formed from basic sound units that make up words. Each phoneme is given a numeric code and the synthesizer circuit utters these sounds corresponding to the codes when it is activated by a controller. Words and sentences are assembled by stringing together the phonemes. The electronic voice generated in this manner is very flexible since any message can be built up using an appropriate grouping of phonemes.

A second speech synthesis technique is so-called wave form digitization where actual recordings of messages are digitized and stored so that they may be reproduced electronically. The quality of speech in this second technique tends to be better than the phoneme procedure. The drawback to this wave form digitization procedure is that fairly large amounts of memory must be utilized to store the digitized messages. Since each message must be stored, the digitization process is much less flexible than the phoneme synthesis.

Each of the multiple speech synthesizers commercially available includes a text-to-speech algorithm that accepts a control input and performs a synthesis. The program or algorithm used in controlling this process varies in length depending upon the type of speech synthesizer and the quality of speech provided. As a rule of thumb, however, the longer the control algorithm for the speech synthesizer, the better the voice quality from the output of that unit.

Industrial and consumer product uses of speech synthesis are known. An audible message is used for either instructing a user or apprising the user of the status of the system. Speech synthesizers have been used, for example, in an automobile to apprise the motorist of the condition of the automobile. A voice-like message tells the motorist that his seat belts remain unbuckled after he has entered the car and placed his key in the ignition. Use of the speech synthesizer for automobile status warnings have also been used to apprise the user when his automobile has a problem that needs attention.

A typical auto monitoring environment is hot, dirty, and filled with spurious signals from a number of sources. In such an environment, the reliability of the speech synthesizer is placed in jeopardy unless special precautions are taken. As a corollary to this concern, as the complexity of the speech synthesizer system is expanded, the sources of malfunction in such a system also increase.

As speech synthesizers expand their capabilities and as the quality of their voice synthesis improves, such circuits will undoubtedly find other applications in environments equally as hazardous to these systems. Reliability, quality and flexibility are attributes which any speech synthesizing system must exhibit if it is to be used in more than an experimental curiosity used only in tightly controlled environments.

DISCLOSURE OF THE INVENTION

The present invention concerns apparatus for generating synthesized voice messages in response to one or more sensed conditions. The focus of the invention is on reliability and flexibility in generating speech in as cost effective a manner as possible. Certain other features of the invention have particular applicability to a preferred mode of the invention which is a synthesizer unit for generating voice messages concerning an automobile status.

In accordance with the invention, apparatus is provided for generating synthesized voice messages. The apparatus includes a speech synthesizer for generating voice messages with the synthesizer having an input for receipt of control signals and an output for transmitting an analog signal corresponding to the message. A microprocessor is coupled to the speech synthesizer to generate the control signals in response to sensed conditions. The microprocessor has one or more inputs for monitoring these conditions and also includes means for repetitively sampling the conditions in a time varying fashion to ensure valid conditions are sensed. Finally, the apparatus includes circuitry for converting the analog signal from the speech synthesizer into an audible voice message.

The particulars of monitoring the status conditions enable valid data to be generated even under conditions in which spurious electrical signals and noise might otherwise jeopardize the reliability of the system. The microprocessor samples status inputs a number of times with the time separation between subsequent samplings changed so that repetitive spurious signals are unlikely to be synchronized with the sampling. In this way, only valid inputs are sensed by the microprocessor rather than spurious repetitive signals which otherwise might actuate a voice message at an inappropriate time.

A preferred use of the invention is in an automobile where the status of the automobile is continually updated and the microprocessor periodically checks the status to determine whether the motorist is to be apprised of a change in the status. By way of example, if the user enters the automobile, shuts the door, and turns the ignition key without buckling his seat belt, the motorist will be apprised of this fact and told that the seat belt should be fastened. In a similar way, over temperature conditions, low pressure conditions, battery damaging conditions and the like can all be monitored by the microprocessor and if certain ones of the conditions are in existence, the motorist is apprised of that fact.

The preferred speech synthesizer is a separate unit from the microprocessor with each unit having its own operating system. One function of the microprocessor's operating system is to monitor the status of the automobile and generate a control output to the speech synthesizer in response to various status conditions. The algorithm in the speech synthesizer generates an audible message output which is amplified and coupled to a speaker normally coupled to the automobile's radio.

In addition to generating audible voice messages, the microprocessor activates a chime circuit which generates a tone for a specified length of time. The microprocessor also activates visual indicators to give a visual indication of the automobile status. The chime circuitry and visual indicators are operated under control of the microprocessor so that in the event the speech synthesizer circuit malfunctions, some indication as to the status of the automobile is still made available to the motorist.

A particular concern in the preferred speech synthesizer apparatus is in malfunctioning of the unit and a desire to stabilize the unit's operation in the event of such a malfunction. For this reason, the microprocessor monitors the length of the messages as they are synthesized. In the event a message takes a longer period than the longest possible message the unit is programmed to generate the speech synthesizer is deactivated and restarted. In a preferred embodiment, the controller comprises a microprocessor and a power down and power up procedure is performed so the speech synthesizer resets itself.

As is the case with most microprocessors, both the microprocessor and speech synthesizer require a 5 volt energization signal. Typical voltage regulators used in generating such a 5 volt signal can malfunction in the event too low an input voltage is applied to the voltage regulator. In the present application, the voltage regulator for energizing the speech synthesizer is coupled to the automobile battery which, under normal circumstances, generates a voltage in the 12 volt range. This is large enough to allow the voltage regulator to perform its function. When the engine is cranking, however, the battery output can drop much lower than 12 volts and can possibly drop in the range of approximately 6 ½ volts. Most voltage regulators will malfunction with such an input voltage and it is one aspect of the invention that special precaution is taken to ensure synthesizer operation even at low battery voltages experienced during engine cranking.

The particular operating system for the microprocessor utilized in a preferred mode of the invention includes a procedure for automatically sensing whether the microprocessor is performing the operating system. In accordance with this procedure, a periodic signal is regularly generated at one output port of the microprocessor. This regular, repetitive signal is periodically monitored by a specialized circuit and in the event this signal does not occur, the microprocessor is reset.

In the competitive environment in which speech synthesizer units are marketed, cost effectiveness is another concern in designing a speech synthesizer. The present unit utilizes a speech synthesizer circuit which requires both positive and negative 5 volt energization signals. The circuitry for generating the 5 volt signal is unique so far as applicants are aware, and incorporates procedures whereby operation of the circuit varies depending upon the voltage generated by the automobile battery. The preferred speech synthesis circuit features certain capabilities unavailable in prior art automobile speech synthesizers. The synthesizer circuit includes a control mechanism whereby the output from the speech synthesizer has a loudness which depends upon the volume setting of the automobile radio. If the radio is not turned on, or if the volume setting on the radio is not set to at least a certain minimum, the speech synthesizer has a default setting which causes a certain volume message to be generated.

The present synthesizer tracks a number of different status conditions in the automobile. Prior art synthesizers were limited to a few messages whereas the present preferred embodiment of the invention includes more than a dozen inputs resulting in a large number of possible messages. The software of the speech synthesizer, in conjunction with the specific digitized data stored in memory, results in a very pleasing, extremely realistic message generation. The realism is primarily a function of the choice of the data used by the speech synthesizer as it forms the message.

From the above, it should be appreciated that one aspect of the invention is the provision of a speech synthesizer system for use in an automobile which is reliable, cost effective, and produces a realistic, audible message to apprise the automobile user of the status of the automobile. Other aspects, features and advantages of the invention will become understood more clearly when a detailed description of a preferred embodiment of the invention is discussed in conjunction with the accompanying drawings.

BEST MODE FOR CARRYING OUT THE INVENTION

Figure 1:
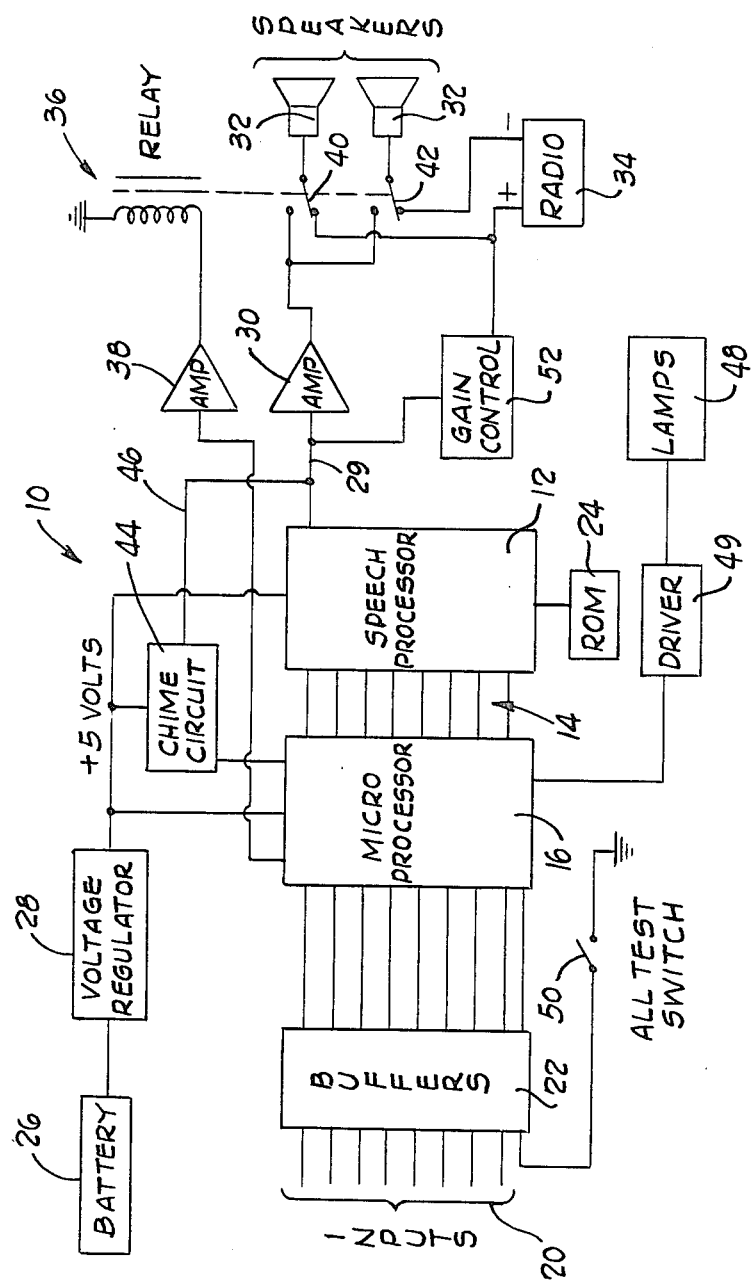
FIG. 1 is a schematic of a speech synthesizer system constructed in accordance with the invention.

Turning now to the drawings and in particular to FIG. 1, there is illustrated a speech synthesizer circuit 10 having a speech synthesizer processor 12 connected by a data bus 14 to a microprocessor controller 16. The microprocessor controller is coupled to a series of status monitoring transducers having inputs 20 to buffer units 22 coupled to inputs on the microprocessor controller 16. In a preferred embodiment of the invention, the synthesizer circuit 10 is used for monitoring the status condition of an automobile and apprising a motorist of certain status conditions when they arise. Typically, the circuit 10 is used to generate warnings of conditions which should not be ignored.

The microprocessor controller 16 executes an operating system stored in an internal memory unit and continually polls the inputs 20 and compares the status of these inputs with indicators programmed into the microprocessor controller's operating system. These preprogrammed indicators dictate when the motorist is to be made aware of the status condition of the automobile. By way of example, the circuit 10 provides a voice message warning if the ignition is on, the engine is running, and the parking brake has not been fully released. Under these conditions, the circuit 10 will warn the motorist "the park brake is not fully released". In order that the microprocessor controller 16 be aware of these factors, an input corresponding to an alternator signal tells the controller 16 that the engine is running, another input from the ignition switch indicates the ignition switch is on, and finally another input senses the condition of the parking brake.

When a condition is sensed which causes the microprocessor operating system to activate a message, the speech synthesizer 12 is sent a control signal along the data bus 14. The speech synthesizer 12 includes its own operating system which, upon receipt of the control signal, will access a ROM memory unit 24 and generate the appropriate audible message. The ROM memory unit 24 stores digitized versions of various words and phrases and the microprocessor controller 16 tells the speech synthesizer 12 the address locations of these message components. Thus, if the above parking brake message is to be generated, a series of ROM addresses is transmitted to the processor 12 corresponding to this park brake message. The processor 12 is then sent a separate signal causing it to get the digitized data from the ROM 24 and use this data to produce the appropriate message.

The microprocessor 16, speech synthesizer 12 and ROM memory unit 24 are all powered by a voltage signal from a car battery 26. The battery 26 generates an output voltage (typically 12 volts) to a voltage regulator 28 which produces a 5 volt signal for energizing the microprocessor 16 and speech synthesizer 12. Although not disclosed in FIG. 1, the circuit 10 includes a circuit portion for generating a −5 volt signal which is necessary for the particular speech synthesizer and memory unit utilized in the circuitry shown.

An output 29 from the speech synthesizer 12 is coupled through an amplifier 30 to two automobile speakers 32. The amplifier 30 amplifies an analog output from the speech processor 12 so that the speakers can convert the amplified signal into an audible message.

As shown in FIG. 1, the two speakers 32 are also coupled to an automobile radio 34 so that the speakers 2 serve a dual function in the circuit 10. When the microprocessor 16 senses a status condition which requires an audible message, it sends a control output to a relay 36 through an amplifier 38 thereby energizing that relay. When energized, the relay switches two contacts 40, 42 thereby coupling the speakers 32 to the amplifier 30.

In addition to generating audible messages, the circuit 10 can generate a tone through a chime circuit 44. The chime signal is an alternating signal having a frequency of about 730 hertz. An output 46 from this chime circuit is coupled to an input to the amplifier 30 so that both the chime circuit 44 and speech synthesizer 12 use the same speakers 32 in generating an audible message.

Also depicted in the FIG. 1 schematic are lamps 48 which operate under control of the microprocessor 16 through an interface circuit 49. By selectively energizing these lamps 48 the circuit 10 can generate a visual output in addition to an audible output from the chime circuit 36, and the voice from the speech processor 12.

One further component shown in the FIG. 1 schematic is an all test switch 50 which enables the user and/or demonstrator of the synthesizer circuit 10 to activate the controller 16 and cause all messages stored in the ROM memory unit 24 to be spoken. Thus, the actual condition need not exist for the system to be tested to ensure that the circuit 10 is properly functioning. The all test switch is also a convenience feature for the automobile salesman while selling a customer on the advisability of obtaining a voice message generation option when the automobile is purchased.

The volume output from the speech synthesizer as well as chime circuit is related to the volume output of the radio 34. A gain control circuit 52 interposed between the radio and the amplifier 30 automatically adjusts the output of the amplifier to assure that the chime signal and/or the speech processor message tracts the volume output from the radio. If the radio is turned off or set below a certain limit, a default volume setting is provided so that a certain minimum message volume is achieved.

Figure 3:
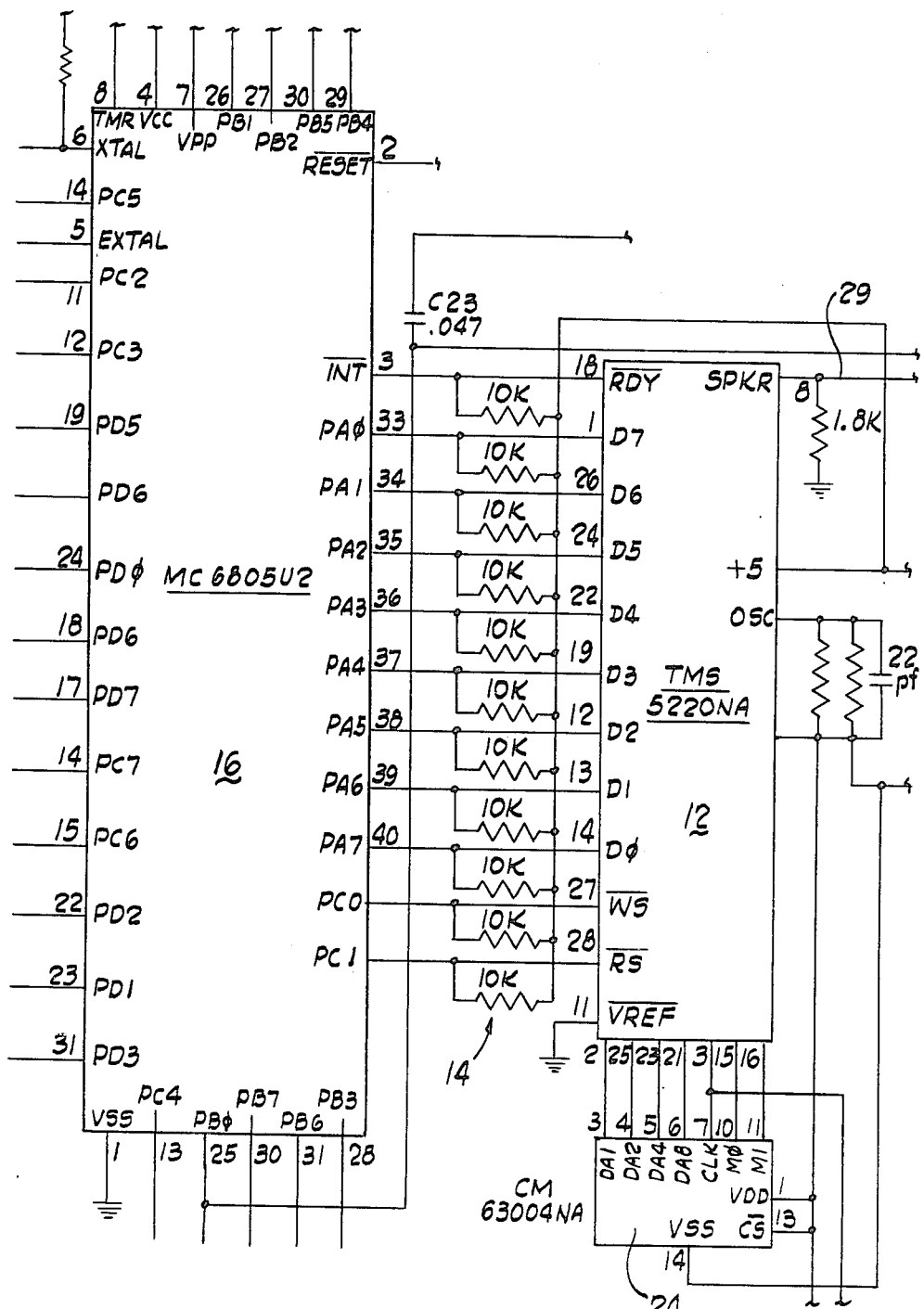
FIG. 3 is an enlarged schematic showing an interconnection between a dedicated microprocessor and a speech synthesizer integrated circuit used in the synthesizer system.

Details of the interconnection between the microprocessor 16 and the speech synthesizer 12 are illustrated in FIG. 3. The speech synthesizer is a Model TMS 5220 Voice Synthesis Processor (VSP) from Texas Instruments and the microprocessor 16 is an 8 bit Motorola MC-6805 U2 microprocessor. Speech data is compressed using pitch-excited linear predictive coding and is supplied to the speech processor 12 by a Model CM 63004NA voice synthesis memory 24. The speech synthesizer 12 decodes data from this memory to construct a time varying digital filter model of a voice tract. This model is excited with a digital representation of either glottal air impulses (voiced sounds) or the rush of air (unvoiced sounds). The output of this model passes through an 8 bit digital-to-analog converter to produce a synthetic speech waveform at an output 29 from the speech synthesizer 12.

An interface between the speech synthesizer 12 and the microprocessor 16 comprises an 8 bit bidirectional data bus 14 leading from output port A from the microprocessor 16 to 8 data input pins on the speech synthesizer 12. The speech synthesizer also includes input pins for controlling read operations (RS) write operations (WS) and a ready input (rdy).

In operation, the microprocessor 16 passes commands to the speech synthesizer 12 which then carries out activities to generate a voice message. To produce speech, the microprocessor 16 selects a desired word or phrase and locates the starting address of the data for that desired word or phrase in the memory unit 24. This starting address is passed to the speech synthesizer 12 and a command given to utilize the data from the memory unit 24 to generate a message.

Speech synthesis is accomplished by a process of recovering data from the memory unit to a buffer internal to the speech synthesizer. From this buffer the data is transmitted to a so-called "parameter input register" where the data is unpacked and interpreted and then sent to a digital-to-analog converter. The output from the digital-to-analog converter is a signal of between 0 to 1.5 milliamps with a resolution of 5.9 micro amps.

With a 1.8 kilo ohm resistor coupled to this output the speech synthesizer delivers an analog audio output which is amplified and converted into audible messages.

If the microprocessor 16 tries to pass a command to the speech synthesizer 12, while another command is executing, the new command will not be accepted until the previous command is completed. The speech synthesizer 12 keeps the microprocessor executing wait states until it is ready to accept the new command. This is accomplished by a coupling between the ready output (pin 18) from the speech synthesizer and an interrupt input (pin 3) to the microprocessor. A complete listing of the possible messages is not provided since this listing will vary with car manufacturer. Generally, however, the typical messages are warnings to the motorist that a problem exists that should be corrected.

Other details of the speech generation process are not supplied in the present applicaton but are readily available to one seeking such information. Two publications published by the engineering staff of Texas Instruments entitled "TMS 5220 Voice Synthesis Data Manual" and "TMS 5220 Speech Evaluation Kit Users Manual", published June 1981 and February 1982 respectively provides such details and are incorporated in the present application by reference.

Various features in both the circuit 10 as well as procedures performed by the two processors 12, 16, are believed to be novel and form the basis for our claim of patent coverage. The circuit 10 will be described in detail in conjunction with FIGS. 2A and 2B and then certain features of the processor operation will be discussed.

BATTERY INPUT

Figure 2A:
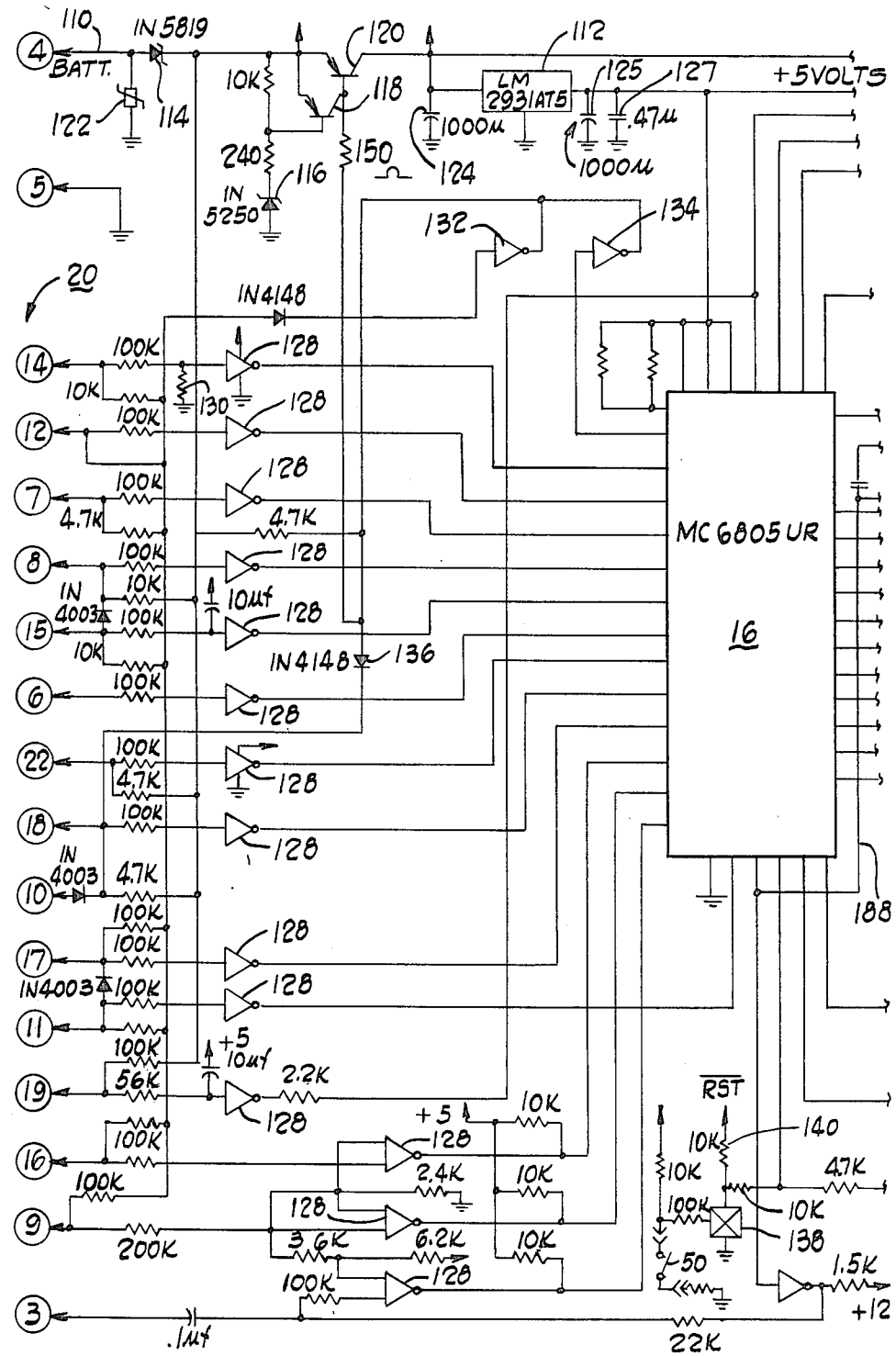
FIG. 2A and 2B are more detailed schematics of the FIG. 1 system.

Power for the two processors 12, 16 is provided in the upper left hand corner of FIG. 2A where a battery input 110 is shown. The automobile battery voltage is rated for between 9 and 15 volts but in practice, especially when the automobile engine is cranking, the output from the battery may fall to the vicinity of 6.5 volts. A special voltage regulator 112 connected to the input 110 is chosen so that even in the event the battery voltage drops as low as 6.5 volts, a 5 volt output signal is created by the regulator 112. A diode 114 prevents a negative rather than a positive voltage from being coupled to the voice synthesizer circuit 10. Thus, in the event the battery connection is reversed, the back biased diode 114 transmits no voltage to the remaining portions of the circuit.

A zener diode 116 protects the circuit 10 from an overvoltage condition (such as might take place in the event the car is jump-started). The zener diode 116 conducts whenever the voltage at the input 110 exceeds 18 volts. When this happens, the combination of a 10K and 240 ohm resistor generates a signal which turns on a transistor 118 and turns off a second transistor 120. Thus, in the event of an over voltage condition, the zener diode 116 prevents this voltage from being transmitted to the voltage regulator 112 downstream in the circuit. Also connected at the battery input 110 is a varistor clamp 122 that inhibits transients which might appear at the input 110 to less than 33 volts.

A capacitor 124 coupled between the input of the voltage regulator 112 and ground avoids disruption of the 5 volt voltage regulator output in the event the transistor 120 is momentarily turned off by a voltage spike or the like. The charge on the 1,000 micro-farad capacitor 124 keeps the voltage above the level of 6 volts in the event a temporary spike turns off the transistor switch 120 and keeps the voltage from dropping too low until the switch is reactivated as the spike disappears. Two output capacitors 125, 127 act as filters for the output of the voltage regulator. The 1,000 microfarad capacitor 125 filters out low frequency transients and the 0.47 micro-farad capacitor 127 high frequency transients. The output from the voltage regulator is coupled to the 5 volt input (VCC) on the MC 6805 U2 microprocessor 16 (see FIG. 3).

INPUT AND OUTPUT CONNECTOR

At the extreme left hand side of FIG. 2A are a number of inputs 20 to the circuit 10. These inputs are transmitted to the voice generation circuit by an edge connector having 24 discreet pins. The inputs 20 are labeled in FIG. 2A with their pin designations on the 24 pin connector. This connector also supports output signals and their pin designations are labeled in FIG. 2B. All connector inputs and outputs have been circled to distinguish them from other reference numerals in the disclosure. Table I is a complete listing of the 24 pin connector designations.

TABLE I

TABLE I

| 1. Speaker − | 13. Seat belt lamp |
|---|---|
| 2. Speaker + | 14. Alternator |
| 3. Low coolant | 15. Overtemperature sensor |
| 4. Battery | 16. Fuel level sensor |
| 5. Ground | 17. Brake switch |
| 6. Headlight on | 18. Door switch |
| 7. Seat belt retractor | 19. Low fuel switch |
| 8. Engine crank sensor | 20. Low fuel lamp |
| 9. Oil pressure sensor | 21. Low coolant lamp |
| 10. Headlight warning lamp | 22. Key |
| 11. Park brake switch | 23. Radio + |
| 12. Ignition | 24. Radio − |

The three inputs designated low fuel switch, fuel level sensor and oil pressure sensor are analog inputs whereas the remaining inputs are digital (on/off) in nature. In addition, the low coolant input is an alternating current signal. Each of the inputs are coupled to CMOS hex inverter buffers 128 through a current limiting resistor of 100 kilohms. It should be noted that a resistor 130 tied to this current limiting resistor on the alternator input (pin 14) acts as a voltage divider to limit the size of the alternator input to an acceptable level. The buffers 128 for pins 19, 16, and 9 are comparators so that the analog inputs at these pins are converted to digital outputs coupled to the processor 16. A series of resistors immediately beneath the current limiting resistors are pull up resistors for the buffers 128. The output from these buffers are tied directly to the controller 16 where their status can be monitored under control of the controller's operating system.

POWER-UP

Immediately beneath the voltage regulator 112 in FIG. 2A are two inverting drivers 132, 134. A first of these inverting drivers is directly coupled to the ignition input (input pin 12) and when an ignition signal is received, a low signal is coupled to the base input of the switch transistor 120. This in turn couples the battery input 110 to the voltage regulator 112 causing power to be transmitted to the microprocessor 16. It should be noted that the door switch (pin 18 on the connector) is also coupled to the base input of the transistor switch 120 through a diode 136 so that power is also coupled to the microprocessor 16 when the door is opened. It is possible for one to enter the car by opening the door, shut the door yet not turn on the ignition. It is desirable that power be coupled to the microprocessor 16 both when the door is first opened and after the door has been closed and the ignition switch is closed. Once power is transmitted to the microprocessor, the algorithm for the microprocessor latches the power from the battery by generating a high signal at pin 14 (FIG. 3) which causes the second inverting driver 134 to generate a low output, thereby insuring the transistor switch 120 remains conducting and voltage is transmitted to the microprocessor 16.

ALL TEST FEATURE

Located directly beneath the microprocessor 16 is the "all test" switch 50. This all test switch 50 enables the speech synthesizer to be demonstrated without actually experiencing the conditions which activate the messages. Thus, in a demonstration of the speech synthesis capability the all test switch is actuated and the microprocessor 16 will cause the speech synthesizer 12 to generate each of the messages in turn. When this switch 50 is closed, an analog switch 138 couples a reset input on the microprocessor 16 which is normally 5 volts to ground through a 10K resistor 140. When this occurs, the voltage at pin 32 on the microprocessor (port PB-7) goes low. The microprocessor 16 periodically polls this pin to see if the all test switch 50 has been actuated within six seconds of ignition actuation. If more than six seconds has passed since the ignition switch is closed, the microprocessor 16 ignores the all test request.

SPEECH SYNTHESIZER POWER

When the speech synthesizer 12 is not in operation, no power is suplied to the synthesizer. Output pin 27 of the microprocessor 16 is coupled through an inverter 142 (FIG. 2B) to the control input on an analog switch 144. The output from this inverter 142 is also connected to the base input of a transistor 146. A low output from the inverter 142 turns on the transistor 146 thereby coupling a +5 volt signal from the voltage regulator 112 to the synthesizer 12.

Figure 2B:
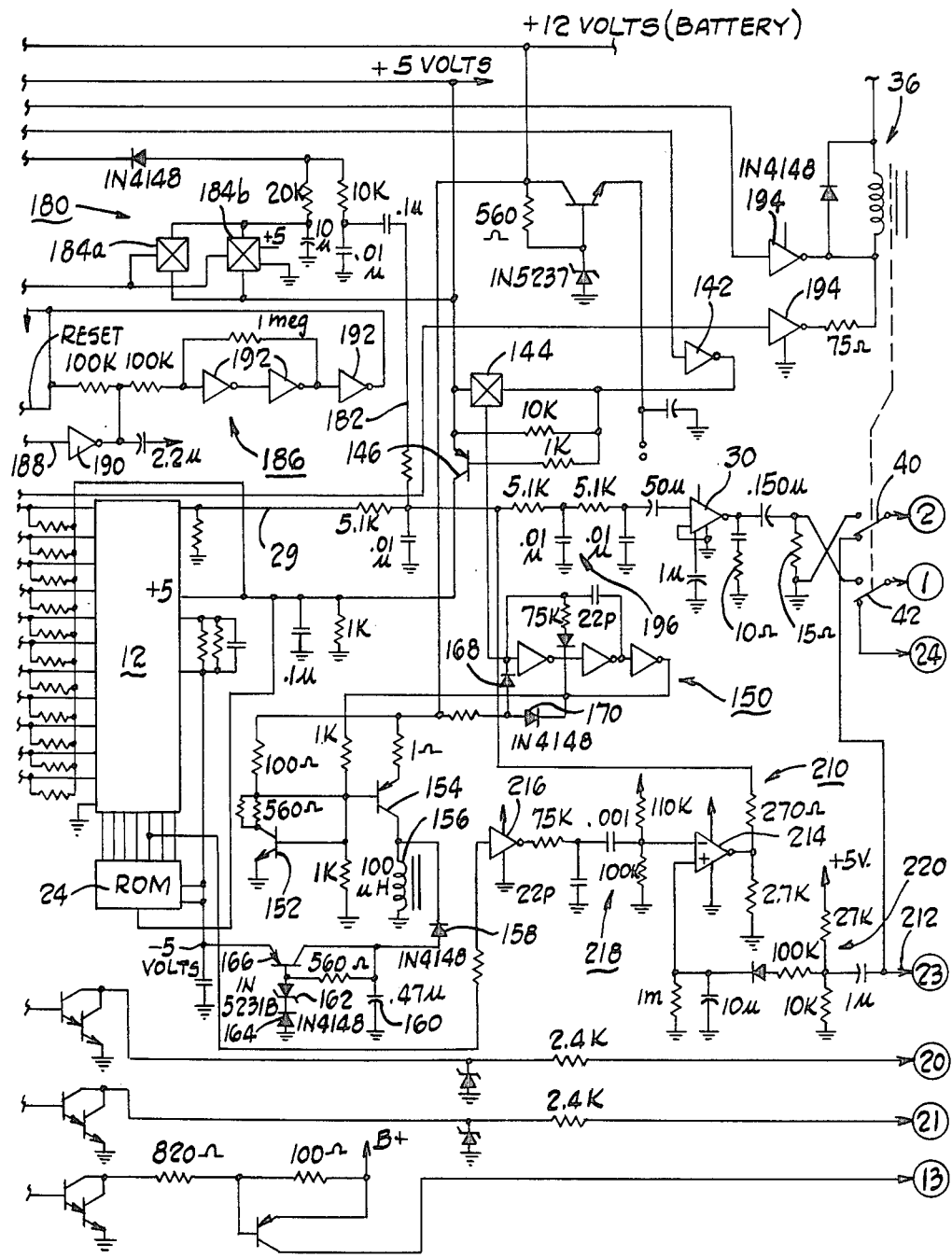

The analog switch 144 controls the sending of −5 volt power to the speech synthesizer 12 and the ROM memory unit 24 which services the speech synthesizer. When the output from the inverter 142 is high a positive 5 volt signal is also coupled through the analog switch 144 to an oscillator circuit 150 located beneath that switch 144 in FIG. 2B. This latches the oscillator 150, preventing it from oscillating. When the inverter output goes low, 5 volts is supplied through the transistor 146 and the positive 5 volts is disconnected from the oscillator 150 as the analog switch 144 is turned off. This causes the oscillator 150 to generate an AC signal which is coupled to the base input of a transistor 152. This transistor 152 alternately turns on and off which in turn causes a transistor 154 to also alternate. When this transistor 154 conducts, a 12 volt signal from the battery at the top of FIG. 2B is coupled to a 100 microhenry coil 156, driving current through that coil. Successive cycles of energization and deenergization of the coil by the circuit 150 produce a current in a diode 158 which is rectified by that diode and filtered by a 0.47 microfarad capacitor 160 to produce a negative voltage at the anode of the diode 158. This negative voltage is regulated by a zener diode 162 which in combination with a diode 164 and a transistor 166 produce a −5 volt supply voltage to both the speech synthesizer 12 as well as the ROM memory unit 24 coupled to the speech synthesizer 12.

During a development stage of the circuit 10 a problem developed which caused the coil 156 to short and the transistor 154 to fail. The problem developed due to an overheating of the coil 156 with a result in lowering resistance and burn out of the transistor 154. To relieve this problem, the frequency of the oscillator circuit 150 is variable with battery voltage. It is seen that the 12 volt DC signal from the battery is coupled to the oscillator circuit 150 by two diodes 168, 170. Increases in this voltage reduce the oscillator duty cycle thereby reducing the on time of the transistor 154. Thus, as the battery voltage increases, the transistor 154 remains conductive for shorter periods of time thereby avoiding the failure mode.

"CHIME" GENERATION

Shown positioned above the speech synthesizer 12 in FIG. 2B is a "chime" circuit 180 which generates a chime rather than a voice signal. As seen, an output 182 from the chime circuit is directly coupled to the output 29 from the speech synthesizer 12 which carries the voice messages. The chime circuit 180 is operated under direct control of the microprocessor 16 rather than the speech synthesizer 12. Thus, if there is a problem with the speech synthesizer 12, the circuit 10 can still generate chimes. The chime circuit 180 includes two analog switches 184a, 184b coupled to the 5 volt output from the voltage regulator 112 and the positive side of a 10 microfarad capacitor. Experimentation with this chime circuit indicates that it is only necessary to hit the chime circuit hard initially and allow an exponential decay of the amplitude of this signal with time until a threshhold is reached at which time the signal is terminated. The microprocessor 16 initially generates a 5 volt signal at pin 29 causing the 5 volts from the voltage regulator to be coupled through the regulator 184a to the positive side of the 10 microfarad capacitor. Pin 30 on the microprocessor is periodically grounded at a frequency of 730 hertz so that initially a 5 volt 730 cycle signal is coupled to the audio amplifier 30 which in turn is coupled to the radio speakers. There is a decay of this 5 volt signal with time. This decay is caused by the periodic grounding of pin 29 on the controller 16 to simulate an exponential decay in a piecewise fashion. Grounding of pin 29 couples the 10 microfarad capacitor to +5 through the analog switches 184a, 184b.

DEAD MAN TIMER

Directly below the chime circuit 180 is a so-called dead man timer 186 which causes an automatic reset of the microprocessor 16 in the event certain conditions are not satisfied at an input 188 to the timer. The algorithm of the microprocessor calls for the generation of a signal every 20 milliseconds as an output from pin 25 (PB-0) which is inverted by an inverter 190 and then to the dead man timer circuit 186. So long as this periodic signal is generated no reset function will occur, but in the event the oscillating signal is not periodically generated, a series of inverters 192 included in the dead man circuit generate a low input to the microprocessor reset input (pin #2) causing the operating system to re-start.

The repetitive signal from controller pin 25 is also coupled to the relay coil 36 in the upper right hand portion of FIG. 2B. This relay coil is initially energized by an output from pin 26 on the microprocessor. When this pin goes high, the relay coil is energized since it passes through an inverter 194. Once the coil 36 is energized the oscillating output from pin 25 keeps the coil energized. The microprocessor knows that when the coil is to be energized, the duty cycle of this oscillating signal switches from a sequence of pulses which are primarily low thereby not providing enough energy for the coil to energize it to a situation in which the sequence of pulses has a duty cycle which is primarily on and thereby enough energy is generated to hold the energized coil in its energized state. The inverter 194 inverts the output from this pin so that a normally "on" signal corresponds to a normally low signal appearing at the end of the relay coil. The dead man circuit does not care whether the oscillating signal (from pin 25) is on or off for a dominant amount of time, it only looks for change of state and if they occur, the dead man circuit inverters 192 avoid a reset.

GAIN CONTROL

The speech synthesizer output 29 is amplified by amplifier 30 after passing through a trio of 3K hertz filters 196. These filters filter out signals having frequencies greater than 3 kilohertz. Since all useful voice signals are less than 3 kilohertz, the output from the speech synthesizer remains unaffected. When the coil 36 is energized the contacts 40, 42 on the relay flip from their normally closed to normally open state thereby coupling the output from the speech synthesizer 12 to the radio speakers 32.

Beneath amplifier 30 is an automatic gain control circuit 210 which causes the output from the speech synthesizer 12 to track the volume control of the radio. This circuit 210 includes an input 212 from the radio (at connector pin 23) which is coupled through a rectifier and filter network which produces a DC level signal which is proportional to the radio volume. The rectified radio signal is coupled to a non-inverting input on a comparator 214. An inverting input to comparator is generated by a clock signal from the speech synthesizer 12 and in particular, a 160 kilohertz clock signal passes through an inverter 216 and filter 218 circuit to produce a triangle wave form at the inverting input of the comparator 214. The comparator's two inputs are compared and whenever the DC signal from the radio is greater than the triangle wave, a pulse is generated by the comparator. In this way, the on duty cycle of the output from the comparator is related to the volume control of the radio.

The comparator output signal is coupled to the output 29 from the speech synthesizer 12. The comparator signal oscillates with a frequency of approximately 160 kilohertz and is totally inaudible to the human ear. The high frequency output from the comparator is combined with the low frequency signal yet is never heard due to the high frequency of the level control. The power of the signal reaching the amplifier 30, however, is the combination signal so that the amplified signal is proportional to the volume setting of the radio. Even if the radio is turned off the circuit 210 generates a minimum high frequency signal which is combined with the synthesizer output. This minimum signal is caused by a voltage divider 220 which insures a certain minimum voltage input to the non-inverting input to the comparator 214.

THE PROCESSORS

Certain important features of the synthesizer circuit 10 are not readily apparent from the schematic of FIGS. 1-3. A very significant one of these features is the so-called debouncing of the inputs 20 from the various sensors. The environment in which the voice synthesizer circuit 10 must operate is a very noisy, high interference environment which potentially produces a great deal in various types of spurious signals that degrade circuit performance. These signals are likely to occur as inputs from the various sensors and if caution is not taken, these signals will be interpreted as valid signals from the various transducers. To avoid this situation, a valid signal must appear from one of the inputs to the microprocessor 16 for eight consecutive time periods. This by itself will not avoid the recognition of spurious signals. What is used, however, is a technique whereby the sampling time in which the signals must be present is kept at a constant yet the time period between these sampling time periods is varied so that any repetitive spurious signals will not activate the microprocessor 16. This is accomplished through software control of the monitoring of input ports on the controller 16.

The MC-6805U2 microprocessor 16 includes a 64 byte RAM area for storing varous constants, counters and variable data. Fourteen RAM locations in the microprocessor memory space are used for storing input data from various transducers coupled to fourteen of the pins listed in Table I. The address locations for these RAM storage registers are listed below in Table II.

TABLE II

| Location | Label | Designation |
| --- | --- | --- |
| 0046 | Input 0 | Alternator Output Low |
| 0047 | Input 1 | Ignition On |
| 0048 | Input 2 | Oil Pressure Low |
| 0049 | Input 3 | Fuel Level Low |
| 004A | Input 4 | Coolant Level Low |
| 004B | Input 5 | Headlamps On |
| 004C | Input 6 | Engine Hot |
| 004D | Input 7 | Parking Brake Set |
| 004E | Input 8 | Brake Pressure Low |
| 004F | Input 9 | Driver's Door Open |
| 0050 | Input A | Engine Cranking |
| 0051 | Input B | Seatbelt Retracted |
| 0052 | Input C | Key in Ignition |
| 0053 | Input D | Fuel Level Low |

The microprocessor 16 has a time register where there is stored a number which is variable. This number is decremented with each $128^{th}$ microprocessor clock signal until it reaches zero. Where it reaches zero a software interrupt is created, which causes the microprocessor to branch to a section of its operting system to read and store the various inputs into the fourteen RAM locations. An assembly language listing of the interrupt routine is provided as appendix A to this disclosure.

The appendix A listing updates 1 bit of the 8 bits in each of the fourteen RAM locations every time the interrupt routine is accessed. On the next successive interrupt request the 1 bit stored on the previous interrupt is shifted 1 bit to the left and one additional bit is stored. Eight successive valid status indicators must be received before one of the RAM locations has a complete byte of all ones or zeros.

Asynchronous sampling of the inputs 20 is accomplished by varying the constant stored in the microprocessor timing register. In a preferred embodiment of the invention thirty-three different constants are used so that the average sampling interval is approximately 23.5 millisecs. To achieve an average of 23.5 millisecs some of the time intervals between interrupts are more and some are less than 23.5 millisecs.

Appendix B to this disclosure is an assembly language subroutine labeled "TMRINT" which varies the contents of the countdown register "TDR" so that the time between interrupts varies from between 20.9 and 25.6 seconds. This is accomplished by adding the variable "TMRADR" to the constant "TIME." TMRADR varies from zero to 21 hexadecimal so that "TRD" varies in 33 increments with an average value to timeout of 23.5 milliseconds.

By changing the interval between interrupts, repetitive spurious signals should not fool the microprocessor into false speech actuation. A few of the eight bits in a RAM location may falsely indicate a status, but unless the spurious signal varies in the same manner that the time constants change, all eight bits will never falsely indicate a condition.

The microprocessor 16 monitors the status of the fourteen RAM locations on a continuing basis and if certain valid status conditions exist, a message will be generated. The conditions which must exist before each message will be generated are stored in a table included in the microprocessor's ROM memory space. The microprocessor continually monitors the contents of this table and compares the table with RAM locations corresponding to the contents of this table. When a match occurs, a voice message is produced.

One feature of the table is that it includes 8 bit bytes as designators of various ones of the inputs. When comparisons between the RAM input locations and the table entries are made, all eight bits must match so that the asynchronous sensing discussed above insures a match between RAM contents and the table only when valid data has been entered into the RAM locations.

Use of the table adds a good deal of flexibility to the speech synthesizer 10. Where conditions under which speech is to be actuated are changed, the table contents are changed, but not the part of the controller operating system that sequentially accesses the table to compare the table contents with the RAM space that table points to. As an example, one message the synthesizer generates is a statement that "The Park Brake is not Fully Released." This message has a six byte table entry in ROM beginning at memory location 090F which looks like:

| 090F | 0910 | 0911 | 0912 | 0913 | 0914 |
|------|------|------|------|------|------|
| Input 1 | Input B | MSG 1 | 81 | 00 | Input |

The microprocessor operating system interprets this to mean if message 1 (the seat belt message) is to be actuated, inputs 1 and B must be true, i.e., the ignition switch is on and the seatbelt is retracted and input 9 must not be true, i.e., the drivers door must be closed. The hexadecimal "81" indicated to the microprocessor that this message is to be generated only once every ignition switch cycle.

If the conditions under which the seatbelt messages are to be actuated change, these table entries change. Thus, if instead of merely testing one of the fourteen inputs it is desirable to actuate speech only after a suitable time delay, one of the tables entries will point to a RAM location where a timing flag is stored instead of where an input is stored.

Another feature not readily apparent from the circuit diagram of FIGS. 2A and 2B is the sensing of synthesizer operation and the timing of this operation. The longest valid phrase generated by the circuit 10 is 4.2 seconds. The time period in which the messages are generated is sensed and if the time period reaches 4.5 seconds, it is known that an invalid or repetitive message not desired by the microprocessor operating system is being generated. This time is checked by checking the status of the speech synthesizer status register at pin 7 of port A on the microprocessor when the RS goes low. In the event speech synthesis lasts more than 4.5 seconds, an automatic reset is performed by turning off power to the speech synthesizer and bringing it back up to power. Assembly language routines for sensing the speech and shutting off and turning back on the synthesizer are provided as appendices C and D to this disclosure.

As noted previously, even if the speech synthesizer 12 is not functioning, the circuit 10 can provide chimes and activate warning lamps to warn the motorist of a certain status condition. The chime routine for various length chimes is listed in appendix E. Briefly, the chime will last for either 0.2, 0.4, or 1.2 seconds depending on what messge is being generated. These chimes normally accompany the speech so the motorist may become accustomed to what chime sequence accompanies what status condition so that in the event speech is not possible due to a malfunction in the speech synthesizer 12, the same chime sequence may provide a sufficient warning.

The circuit 10 is mounted in a metal container (not shown) which helps shield the various components of the circuit from interference as well as acting as a heat sink. The container is mounted on the passenger side of the automobile firewall where cabling can be routed from the various transducers sending inputs 20 to the synthesizer.

The present speech synthesizer module has been described with a degree of particularity. It should be appreciated that certain design modifications in the disclosed design are possible. It is the intent, however, that the invention include all such modifications and/or alterations falling within the spirit or scope of the appended claims.

```
*                                              **
*                                              **
*  TIMER INTERRUPT ENTRY POINT *****************
*                                              **
*                                              **
*

0D0E 1F 09      A   TMRINT  BCLR    7,TCR    RESET TMR FLAG
0D10 A6 89      A           LDA     #TIME
0D12 B7 08      A           STA     TDR
                *
```

```
                    * INPUT SAMPLING
                    *
0D14  B6 03      A  SCAN    LDA   PORTD         SAMPLE PORTD
0D16  A4 31      A          AND   #$31          CLEAR THOSE INPUTS ACTIVE LOW
0D18  B7 6D      A          STA   NATHI         STORE IT
0D1A  B6 02      A          LDA   PORTC         SAMPLE PORTC
0D1C  44                    LSRA                SHIFT FOR STORAGE
0D1D  44                    LSRA
0D1E  AA FC      A          ORA   #$FC          SET THOSE INPUTS ACTIVE HIGH
0D20  B7 6C      A          STA   NATLU         HOLDER
                    *
0D22  B6 6B      A          LDA   DEDMAN        AVOID REFRESH
0D24  26 25   0D4B          BNE   OFORON        WHEN FLAGGED
                    *
0D26  00 01 0F 0D38          BRSET 0,PORTB,CHK3DA TO RELAY ON LOGIC
                    *
                    * RELAY OFF LOGIC
                    *
0D29  10 01      A          BSET  0,PORTB       SATISFY DMTMR
0D2B  10 01      A          BSET  0,PORTB
0D2D  10 01      A          BSET  0,PORTB
0D2F  10 01      A          BSET  0,PORTB
0D31  06 03 15 0D49         BRSET 3,PORTD,STRLY COOLANT O.K.
0D34  19 6C      A          BCLR  4,NATLO       COOLANT LOW
0D36  20 11   0D49          BRA   STRLY
                    *
                    * RELAY ON LOGIC
                    *
0D38  11 01      A  CHK3DA  BCLR  0,PORTB       SATISFY DMTMR
0D3A  11 01      A          BCLR  0,PORTB
0D3C  11 01      A          BCLR  0,PORTB
0D3E  11 01      A          BCLR  0,PORTB
0D40  07 03 02 0D45         BRCLR 3,PORTD,NCLAT COOLANT O.K.
0D43  19 6C      A          BCLR  4,NATLO       COOLANT LOW
0D45  10 01      A  NCLAT   BSET  0,PORTB       RST RELAY
0D47  20 02   0D4B          BRA   OFORON        NXT CHK
0D49  11 01      A  STRLY   BCLR  0,PORTB       RST RELAY
                    *
0D4B  06 02 31 0D7F OFORON  BRSET 3,PORTC,OFFCHK IGNITION ON/OFF ?

APPENDIX A

0D4E  02 01 0F 0D60 CHK1B   BRSET 1,PORTB,CHK2C DISABLE FUEL READ IF PICK
0D51  38 53      A          LSL   INPUTD        MAKE ROOM IN HOLDER          TRUE
0D53  A6 FD      A          LDA   #$FD          INVERT DDR'S
0D55  B7 05      A          STA   DDRSB
0D57  03 01 02 0D5C         BRCLR 1,PORTB,TURNB FUEL ELECTR O.K.
0D5A  10 53      A          BSET  0,INPUTD      FUEL ELECTR LOW
0D5C  A6 FF      A  TURNB   LDA   #$FF          RST DDR'S
0D5E  B7 05      A          STA   DDRSB
0D60  05 02 04 0D67 CHK2C   BRCLR 2,PORTC,FLG2C ALT OUTPUT O.K.
0D63  11 6C      A          BCLR  0,NATLO       ALT LOW
0D65  20 02   0D69          BRA   CHK4C
0D67  10 6C      A  FLG2C   BSET  0,NATLO       ALT O.K.
0D69  09 02 02 0D6E CHK4C   BRCLR 4,PORTC,CHK6C PRK BRK FREE
0D6C  12 6D      A          BSET  1,NATHI       PRK BRK SET
0D6E  0D 02 02 0D73 CHK6C   BRCLR 6,PORTC,CHK1D BRK PRESS O.K.
0D71  14 6D      A          BSET  2,NATHI       BRK PRESS LOW
0D73  02 03 02 0D78 CHK1D   BRSET 1,PORTD,CHK2D OIL O.K.
0D76  15 6C      A          BCLR  2,NATLO       OIL LOW
0D78  04 04 02 0D7D CHK2D   BRSET 2,PORTD,TOUT  FUEL MECH O.K.
0D7B  17 6C      A          BCLR  3,NATLO       FUEL MECH LOW
0D7D  20 1B   0D9A  TOUT    BRA   ONWARD
                    *
```

APPENDIX A - cont.

```
                         * IGNOFF CHECKS
                         *
0D7F B6 6D      A    OFFCHK  LDA    NATH1
0D81 A4 48      A            AND    #$48       ZERO IGNON INPUTS
0D83 B7 6D      A            STA    NATH1
0D85 B6 6C      A            LDA    NATLO
0D87 AA 1D      A            ORA    #$1D
0D89 B7 6C      A            STA    NATLO
0D8B 0F 02 02 0D90  CHK7C   BRCLR  7,PORTC,CHKEY DOOR CLOSED
0D8E 16 6D      A            BSET   3,NATHI    DOOR OPEN
0D90 0F 03 02 0D95  CHKEY   BRCLR  7,PORTD,CHK6D KEY OUT
0D93 1C 6D      A            BSET   6,NATHI    KEY IN
0D95 0C 03 02 0D9A  CHK6D   BRSET  6,PORTD,ONWARD HDLMPS OFF
0D98 1B 6C      A            BCLR   5,NATLO    HDLMPS ON
                         *
         0D9A   A    ONWARD  EQU    *
                         *
                         * SHIFT INPUTS 0 THROUGH 5 INTO HOLDERS
0D9A AE 46      A            LDX    #INPUT0
0D9C 78              SIFTER  LSL    ,X         EMPTY BIT 0
0D9D 34 6C      A            LSR    NATLO      TEST SEQUENTIALLY
0D9F 25 04    0DA5           BCS    ENZERO     BIT 0 THROUGH BIT 5
0DA1 F6                      LDA    ,X         BY SHIFTING OUT OF REGISTER
0DA2 AA 01      A            ORA    #$01
0DA4 F7                      STA    ,X         REGISTER HIGH
0DA5 5C              ENZERO  INCX              REGISTER LOW
0DA6 A3 4C      A            CMPX   #INPUT6
0DA8 26 F2    0D9C           BNE    SIFTER
                         * SHIFT INPUTS 6 THROUGH C INTO HOLDERS
0DAA 78              SFTR1   LSL    ,X         MAKE ROOM
0DAB 34 6D      A            LSR    NATHI      TEST BIT 0 THROUGH 6
0DAD 24 04    0DB3           BCC    ENZR1      LEAVE LOW OR
0DAF F6                      LDA    ,X         MASK IN
0DB0 AA 01      A            ORA    #$01       HIGH STATE
0DB2 F7                      STA    ,X
0DB3 5C              ENZR1   INCX
0DB4 A3 53      A            CMPX   #INPUTD
0DB6 26 F2    0DAA           BNE    SFTR1
```

APPENDIX B

```
086F 1F 09      A    MRINT   BCLR   7,TCR      RE T TMR FLAG
0871 30 87      A            INC    TMRADR     UPDATE ASYNC TMR DATA REG
0873 B6 87      A            LDA    TMRADR
0875 A1 21      A            CMPA   #$21
0877 26 02    087B           BNE    CONTAD
0879 3F 87      A            CLR    TMRADR
087B A6 78      A    CONTAD  LDA    #TIME
087D 1B 87      A            ADD    TMRADR
087F B7 08      A            STA    TDR
```

APPENDIX C

```
                         *
                         * ROUTINE TO FEED VSP
                         *
0BD6 08 03 5C 0C35  SPKUP   BRSET  4,PORTD,TRYING QUIT IF CRANKING
0BD9 CD 083E    A            JSR    RSTTMS
0BDC 26 32    0C10           BNE    VSPX       JUST CHIME
0BDE AE 6A      A            LDX    #WORD1+1   LSB
0BE0 AD 2F    0C11           BSR    XMT        PUT IT OUT THERE
0BE2 AE 69      A            LDX    #WORD1     MSB
0BE4 AD 2B    0C11           BSR    XMT        PUT IT OUT THERE
```

```
0BE6 A6 40        A           LDA    #$40
0BE8 AD 39        0C23        BSR    OUTTHR    SEND 5TH NIBBLE
0BEA A6 50        A           LDA    #$50      VSP CMND TO TALK
0BEC AD 35        0C23        BSR    OUTTHR    PUT IT OUT THERE
                  * AWAIT PHRASE FINISH.
0BEE A6 DC        A  TALKNG   LDA    #220      LOAD COUNTER
0BF0 B7 67        A           STA    SAVED
0BF2 4F                       CLRA             CONFIG PORT
0BF3 B7 04        A           STA    DDRSA
0BF5 13 02        A           BCLR   1,PORTC   RDSLCT
0BF7 AD 33        0C2C        BSR    READY
0BF9 08 03 39     0C35 CYCLON BRSET  4,PORTD,TRYING QUIT IF CRANKING
0BFC 3A 67        A           DEC    SAVED
0BFE 26 02        0C02        BNE    CYCLIC    FURTHER COUNTING OR
0C00 20 33        0C35        BRA    TRYING    QUIT
0C02 A6 06        A  CYCLIC   LDA    #6        CHK TALK STATUS
0C04 CD 0D01      A           JSR    ONSEC1    EVERY 20 MSECS
0C07 0E 00 EF     0BF9        BRSET  7,PORTA,CYCLON FOR 4.5 SECS
0C0A 12 02        A           BSET   1,PORTC   DESLCT
0C0C A6 FF        A           LDA    #$FF
0C0E B7 04        A           STA    DDRSA     RECONFIG PORT
0C10 81              VSPX     RTS              NEXT WORD
```

APPENDIX D

```
                  * ROUTINE TO SENSE STABILITY OF VSP
                  *
0C2C 2E 13        0C41 READY  BIL    STEADY    OK
0C2E A6 10        A           LDA    #16       WAIT 100 USECS
0C30 4A              LESSA    DECA
0C31 26 FD        0C30        BNE    LESSA
0C33 2D 0C        0C41        BIL    STEADY    OK
0C35 10 02        A  TRYING   BSET   0,PORTC   DESLCT
0C37 12 02        A           BSET   1,PORTC
0C39 11 01        A           BCLR   0,PORTB   SHUT DOWN
0C3B CD 0BB5      A           JSR    CONSRV    PWRDWN,
0C3E CC 0868      A           JMP    ENGIGN    CONT OPERATION
0C41 08 03 F1     0C35 STEADY BRSET  4,PORTD,TRYING QUIT IF CRANKING
0C44 81                       RST              ALL IS WELL RTN
```

APPENDIX E

```
                  *
                  *                                   **
                  *                                   **
                  * HYBRID CHIME GENERATION   **********************
                  *                                   **
                  *                                   **
                  *
0C45 A6 10        A  CHIMSB   LDA    #TCLS     LOAD STBLT PARAMETERS
0C47 AE 01        A           LDX    #TCMS
0C49 20 10        0C5B        BRA    EXT2
                  *
0C4B A6 90        A  CHIMEO   LDA    #TCLO     LOAD 0.2 SEC PARAMETERS
0C4D AE 00        A           LDX    #TCM0
0C4F 20 0A        0C5B        BRA    EXT2
                  *
0C51 A6 20        A  CHIME1   LDA    #TCL1     LOAD 0.4 SEC PARAMETERS
0C53 AE 01        A           LDX    #TCM1
0C55 20 04        0C5B        BRA    EXT2
                  *
0C57 A6 66        A  CHIME2   LDA    #TCL2     LOAD 1.2 SEC PARAMETERS
0C59 AE 03        A           LDX    #TCM2
                  *
0C5B 9B              EXT2     SEI
0C5C AD 0E        0C6C        BSR    CHIMER    DO CHIMES
```

```
0C5E A6 56    A  CHM1   LDA   #TCL4    LOAD TAIL PARAMETERS
0C60 B7 6E    A         STA   LSB
0C62 A6 02    A         LDA   #TCM4
0C64 B7 6F    A         STA   MSB
0C66 AD 62    0CCA      BSR   TONE     DO LAST CHIME
0C68 3F 6B    A         CLR   DEDMAN
0C6A 9A                 CLI
0C6B 81                 RTS
0C6C B7 67    A  CHIMER STA   SAVED    SAVE DELAY LSB
0C6E BF 68    A         STX   SAVEX    SAVE DELAY MSB
0C70 BE 65    A         LDX   TABLPT   FETCH REPEAT VALUE
0C72 F6                 LDA   X
0C73 3C 65    A         INC   TABLPT
0C75 B7 70    A         STA   CHMNUM
0C77 A6 0A    A  CHR1   LDA   #TCL3    LOAD CAP CHARGE TIME
0C79 B7 6E    A         STA   LSB
0C7B A6 00    A         LDA   #TCM3
0C7D B7 6F    A         STA   MSB
0C7F 18 01    A         BSET  4,PORTB
0C81 AD 47    0CCA      BSR   TONE     DO TONE ATTACK
0C83 B6 67    A         LDA   SAVED    GET DISCHARGE TIME
0C85 B7 6E    A         STA   LSB
0C87 B6 68    A         LDA   SAVEX
0C89 B7 6F    A         STA   MSB
0C8B 19 01    A         BCLB  4,PORTB
0C8D AD 3B    0CCA      BSR   TONE     DO TONE DECAY
```

We claim:

1. Apparatus for generating synthesized voice messages in response to one or more sensed conditions comprising:

speech synthesizer means for generating a voice message, said synthesizer having an input for receipt of a control signal and an output for transmitting an analog signal corresponding to a message;

processor means coupled to said speech synthesizer means to generate said control signal in response to a sensed condition, said processor means having one or more inputs for monitoring said sensed conditions and further including timing means for repetitively sampling status signals at said one or more inputs at times separated by an adjustable, asynchronous sampling interval to ensure a valid condition is sensed; and means coupled to the output of said speech synthesizer means for converting said analog signal into an audible voice message.

2. The apparatus of claim 1 wherein said processor means comprises a register for storing multiple indications of each said sensed condition, and wherein said processor means includes means for comparing said multiple indications to validate said sensed condition so that spurious repetitive signals in the vicinity of the apparatus will not produce a false sensed condition indication.

3. The apparatus of claim 1 or 2 wherein said processor means monitors the status of a plurality of conditions in a automobile and said means for converting comprises a radio speaker and means for selectively coupling said radio speaker to said speech synthesizer means under control of said processor means.

4. In a speech synthesizer for apprising a motorist of the status of an automobile, apparatus comprising:

a microprocessor having a plurality of input and output pins for monitoring the status of said automobile and controlling the generation of voice messages corresponding to said status;

speech synthesizer means coupled to said microprocessor for generating output signals in response to digital control signals from the microprocessor, said synthesizer including a non-volatile memory wherein digital representations of said messages are stored;

an amplifier coupled to said speech synthesizer to amplify said output signals;

speaker means selectively couplable to said amplifier to convert said amplified output signals into audible messages;

chime generating circuitry coupled to an input to said amplifier, said chime generating circuitry having means for generating a tone for a specified length of time; and visual indicator means operatively coupled to said microprocessor to give a visual indication of the automobile status;

said chime generating circuitry operative under control of said microprocessor so that in the event of a malfunction in said speech synthesizer means the motorist is still apprised of the status of said automobile via a tone and said visual indication.

5. In a speech synthesizer for apprising a motorist of the status of an automobile, a method in recognizing a malfunction in said synthesizer comprising the steps of;

monitoring a plurality of status indicators with a programmable microprocessor;

generating one or more voice messages based upon the condition of said status indicators;

timing the length of said messages by checking the condition of a status register in said programmable microprocessor;

comparing the time of message generation with a specific time interval corresponding to a maximum possible length for the messages if said synthesizer is properly functioning; and executing a microprocessor reset in the event said message exceeds the maximum possible length.

6. In a speech synthesizer for apprising a motorist of the status of an automobile, apparatus comprising;

a programmable microprocessor for monitoring the status of said automobile;

a speech synthesizer unit coupled to said microprocessor for generating voice messages related to the status of said automobile, said synthesizer unit having an output through which audio signals corresponding to said messages are transmitted; and means coupled to said output for converting said electrical signals into audible messages, said means for converting including a volume control circuit coupled to an output from an automobile radio to cause the loudness of the messages produced by said speech synthesizer to track the volume setting of the radio, said volume control circuit including means for generating a high frequency signal that varies in duty cycle with the volume setting of said radio and wherein this high frequency signal is added to the audio signals from the speech synthesizer; said means for converting including an amplifier which amplifies the combination of audio signals from said synthesizer and high frequency signals from said volume control circuit.

7. In a motor vehicle microprocessor controlled speech synthesizer, a method for actuating said synthesizer to produce a voice message to apprise a vehicle operator of the status of a motor vehicle comprising the steps of:

monitoring a sequence of status conditions at asynchronous intervals to avoid spurious condition sensing and storing successive indications of these status conditions in a microprocessor memory;

storing a table of flags in a portion of microprocessor memory indicating under what conditions one or more voice messages are to be initiated; and periodically comparing said table of flags with a sequence of said indications and generating an audible message when a match between the flags and indications occurs.

8. Apparatus for generating synthesized voice messages in response to one or more sensed conditions in an automobile comprising:

synthesizer means for generating a voice message, said synthesizer having an input for receipt of a control signal and an output for transmitting an analog signal corresponding to a message;

microprocessor means coupled to said speech synthesizer means to generate said control signal in response to sensed conditions, said microprocessor means having one or more inputs for repetitively monitoring said conditions;

amplifier means coupled to the output of said synthesizer means for converting said analog signal into an audible voice message; and switching means to selectively couple an output from said amplifier means to an audio speaker, said switching means including a relay coil energized by a signal from said microprocessor means to close a contact between said amplifier means and said speaker;

said microprocessor means having first and second control outputs coupled to said relay coil, a first of said control outputs for initializing current flow through said coil and a second control output for maintaining energization of said coil with an alternating signal.

9. The apparatus of claim 8 which additionally comprises a reset circuit for resetting said microprocessor means and wherein said second control output periodically refreshes said reset circuit to avoid resetting of said microprocessor means if said microprocessor means is properly executing its control function.

10. Apparatus for generating an audible indication of the status of a motor vehicle comprising:

a programmable microprocessor including an interface for monitoring one or more status signals indicative of the status condition of said automobile;

a speech synthesizer unit coupled to said microprocessor for generating voice messages related to the status of said automobile, said synthesizer unit having a synthesizer output through which electrical signals corresponding to said messages are transmitted;

means coupled to said synthesizer output for converting said electrical signals into audible messages;

microprocessor energization circuitry coupled to a motor vehicle battery for energizing said microprocessor and synthesizer with signals of about 5 volts, said energization circuitry having
(i) a voltage regulator for producing an output of about 5 volts from a battery input of at least six and one-half volts and
(ii) switching means to couple the motor vehicle battery to the voltage regulator when a status signal indicative of a door open condition is sensed at the microprocessor interface.

11. The apparatus of claim 10 wherein said microprocessor energization circuitry additionally comprises:

an over voltage sensing means for inhibiting large voltage signals from reaching said voltage regulator;

means for inhibiting large transient signals, and means for preventing negative signals from reaching said voltage regulator.

12. Apparatus comprising:

a controller having a plurality of input and output pins for monitoring one or more status conditions of an automobile and controlling the generation of audible messages corresponding to said status conditions;

speech synthesizer means coupled to said controller for generating voice signals in response to digital control signals from the controller;

amplifier means having an amplifier with an amplifier input coupled to an output from said speech synthesizer means for amplifying signals at said amplifier input and for coupling amplified output signals to a speaker for converting said amplified output signals into audible messages; and chime generating circuitry coupled to said amplifier input, said chime generating circuitry having means for generating a tone for a specified length of time, the amplitude of the tone decreasing with time; said chime generating circuitry having a control input coupled to the controller to generate the tone independently of the speech synthesizer means.

13. The synthesizer of claim 12 wherein the chime generating circuitry includes a capacitor which is charged to an initial voltage by the microprocessor and then controllably discharged to produce an exponentially decaying chime amplitude.

14. In a speech synthesizer for apprising a motorist of the status of an automobile, apparatus comprising:

a programmable microprocessor for monitoring the status of said automobile;

a speech synthesizer unit coupled to said microprocessor for generating voice messages related to the status of said automobile, said synthesizer unit having an output through which electrical signals corresponding to said messages are transmitted;

means coupled to said output for converting said electrical signals into audible messages;

circuitry coupled to an automobile battery for energizing said synthesizer with signals of plus and minus 5 volts, said circuitry including:
  (i) a voltage regulator for producing an output of +5 volts from positive inputs from said battery;
  (ii) an oscillator circuit which oscillates in response to a 5 volt signal from said voltage regulator, and
  (iii) means for half wave rectifying an alternating battery input in synchronization with an output from said oscillator circuit to produce a negative 5 volt signal.

15. The apparatus of claim 14 wherein the means for rectifying comprises a coil through which battery current passes under control of a switch activated by an output from said oscillator circuit.

16. The apparatus of claim 15 where said oscillator circuit includes an input from said battery that modifies the duty cycle of the oscillator such that higher battery voltages reduce said duty cycle to maintain a constant peak current through the coil.

17. In a speech synthesizer, a method for generating an audible message corresponding to a status condition of an automobile comprising the steps of:
  (a) monitoring a plurality of automobile status conditions;
  (b) energizing a speech synthesizer circuit when one or more status conditions are to be reported;
  (c) providing a low frequency voice signal output corresponding to an audible message; and
  (d) converting said analog voice signal output into a volume controlled aubile message by combining the low frequency voice signal output from the speech synthesizer circuit with a high frequency signal having a duty cyle related to the volume setting of an automobile radio and amplifying the combined low and high frequency signals.

* * * * *